UNITED STATES PATENT OFFICE.

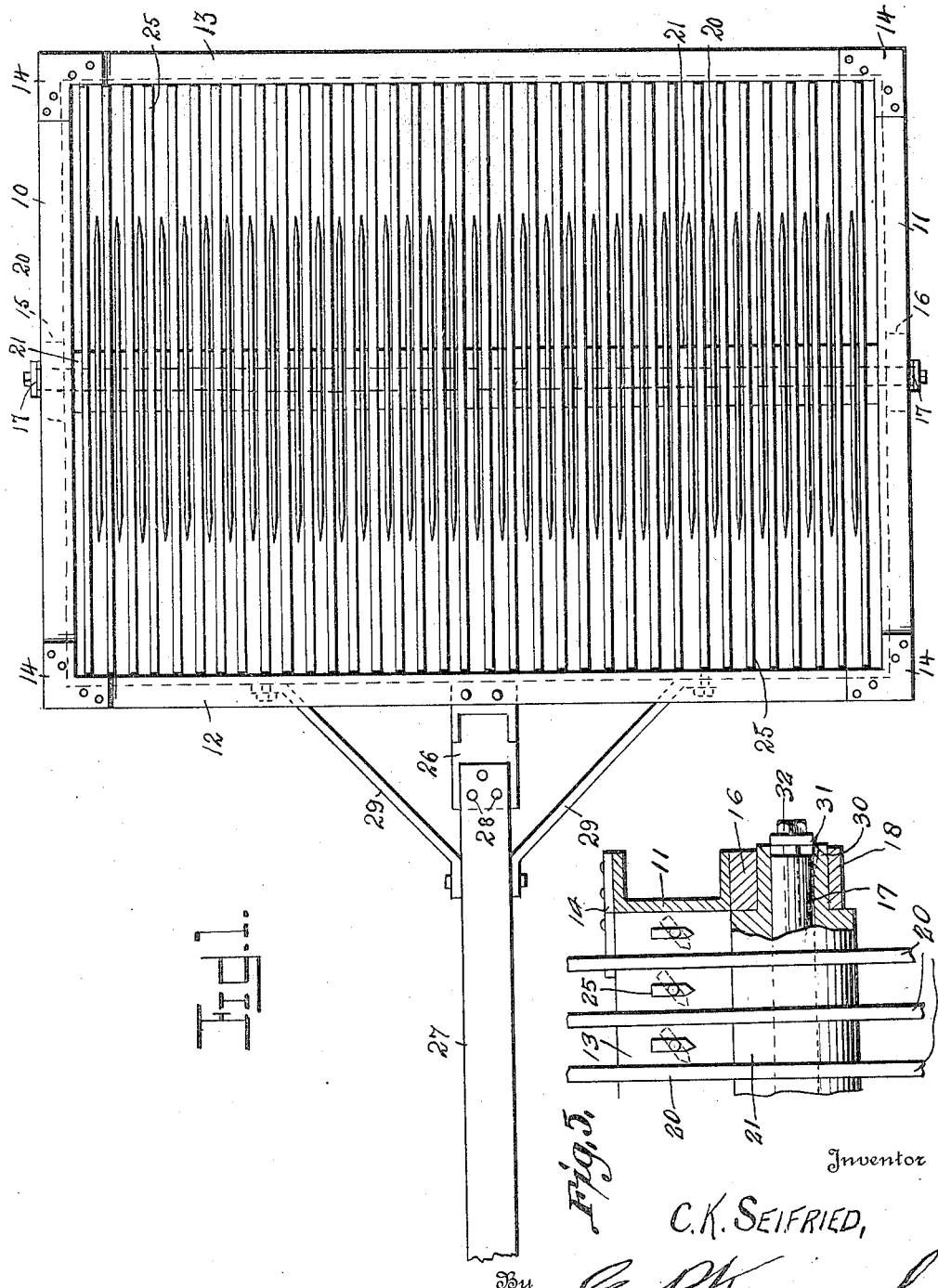

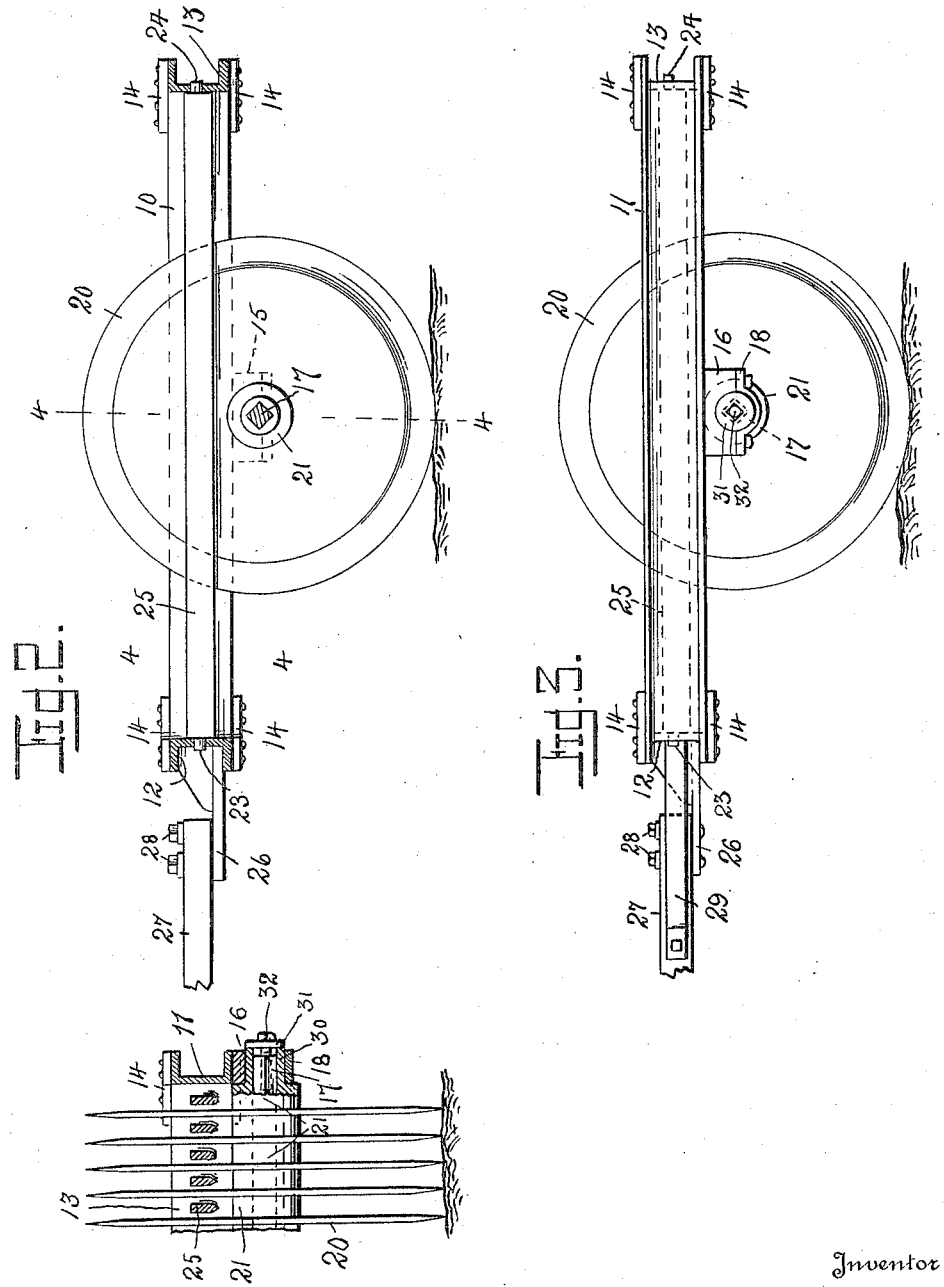

CLARENCE KAST SEIFRIED, OF GRAYVILLE, ILLINOIS.

HARROW.

1,390,169.  Specification of Letters Patent.  Patented Sept. 6, 1921.

Application filed September 17, 1920. Serial No. 410,912.

*To all whom it may concern:*

Be it known that I, CLARENCE KAST SEIFRIED, a citizen of the United States, residing at Grayville, in the county of White and State of Illinois, have invented certain new and useful Improvements in a Harrow, of which the following is a specification.

This invention relates to agricultural implements of the harrow class, more particularly of disk harrow, and has for one of its objects to improve the construction and increase the efficiency and utility of devices of this character.

Another object of the invention is to produce a device of this character adapted to destroy obnoxious growths of plants, and to thoroughly pulverize and disintegrate refractory particles of the soil.

With these and other objects in view, the invention consists in certain novel features of construction as hereinafter shown and described and then specifically pointed out in the claims, and in the drawings illustrative of the preferred embodiment of the invention.

Figure 1 is a plan view of the improved combined disk harrow soil pulverizer and weed destroyer.

Fig. 2 is a section on the line 2—2 of Fig. 1,

Fig. 3 is an end elevation,

Fig. 4 is a detail in section on the line 4—4 of Fig. 2.

Fig. 5 is an enlarged sectional detail illustrating the oscillatory movement of the scrapers.

The improved apparatus includes a supporting frame including end members 10 and 11, forward beam frame member 12 and rear beam frame member 13. The frame members are preferably constructed of channel bars of steel coupled at the corners by clamp brackets 14 riveted or bolted to the frame members, as shown.

Bearing blocks 15 and 16 are attached to the lower faces of the frame members 10 and 11 to support a shaft 17, the blocks having suitable caps 18 to retain the shaft in engagement with the blocks.

Mounted on the shaft are a plurality of alternating cutting disks 20 and spacing washers 21, to retain the disks at uniform distances apart.

The shaft 17 is square or other shape than round, and the disks 20 and washers 21 have their openings to fit the shaft and thus rotate therewith.

The terminal washers are each formed with a bearing 30 which rotatively engage the bearings in the blocks 16 and cap 18.

The square shaft 17 is slightly shorter than combined thickness of the disks 20 and spacing washers 21, and fitting against each of the bearings 30 is a stop washer 31. A cap screw 32 is tapped into the shaft at each end with its head against the stop washers, as shown in Fig. 4.

By this means the various spacing washers and disks can be maintained in close relation upon the shaft and readily tightened if they work loose.

Formed in the confronting faces of the forward and rearward frame members 12 and 13, are sockets to receive the journals 23 and 24 on the ends of clearing or scraper blades 25 and extending between the cutting disks, as shown. The members 25 being journaled at 24 in the frame members 12 and 13, are necessarily free to oscillate therein and vibrate transversely between the disks, as will be obvious. The clearer bars 25 thus automatically adapt themselves to the conditions of the material which may be carried up between the disks and effectually clear the disks.

It will be noted by reference to Fig. 4 that the blades 25 are of greater width than the space between the disks, consequently the blades will not entirely overturn in their oscillatory movement, but will present the sharp edges to the adjacent faces of the disks as the latter rotate against the blades.

Attached to the forward frame member 12 is a bracket device 26 to which a draft tongue, a portion of which is represented at 27, is bolted or otherwise attached, as at 28.

The draft tongue is further supported from the frame by diagonal braces 29.

When an implement thus constructed is drawn over the ground, the disks 20 cut into the soil and thoroughly pulverize and disintegrate it, and the disks being disposed at short intervals, effectually destroy obnoxious weeds or plants, by severing the roots and thus destroying them.

The combined clearing and scraping blades are an important feature of the improved apparatus, as they not only scrape adhering particles from the disks but likewise prevent such particles from attaching themselves to the disks.

The disks may be of any required diameter, and disposed at any required distance apart on the shaft.

The preferred embodiment of the invention is disclosed in the drawings and set forth in the specification, but it will be understood that any modifications within the scope of the claims may be made in the construction without departing from the principle of the invention or sacrificing any of its advantages.

What I claim is:

1. In a disk harrow, a supporting frame including forward and rearward members in spaced parallel relation, a shaft supported by said frame between said forward and rearward members, a plurality of disk cutters mounted upon said shaft in spaced relation, and a plurality of clearer blades extending respectively between said blades and mounted for oscillation in said forward and rearward frame members.

2. In a disk harrow, a supporting frame including forward and rearward members in spaced parallel relation, a shaft supported by said frame between said forward and rearward members, a plurality of disk cutters mounted upon said shaft in spaced relation, and a plurality of clearer blades extending respectively between said blades and mounted for oscillation in said forward and rearward frame members, said blades being of greater width than the distances between the disks so that they will not completely overturn.

In testimony whereof, I affix my signature hereto.

CLARENCE KAST SEIFRIED.